United States Patent
Roth et al.

(10) Patent No.: US 10,158,670 B1
(45) Date of Patent: *Dec. 18, 2018

(54) AUTOMATIC PRIVILEGE DETERMINATION

(71) Applicant: Amazon Technologies, Inc., Seattle, WA (US)

(72) Inventors: Gregory B. Roth, Seattle, WA (US); Eric Jason Brandwine, Haymarket, VA (US); Reto Kramer, Issaquah, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/042,780

(22) Filed: Feb. 12, 2016

Related U.S. Application Data

(63) Continuation of application No. 13/461,542, filed on May 1, 2012, now Pat. No. 9,264,449.

(51) Int. Cl.
*G06F 21/00* (2013.01)
*H04L 29/06* (2006.01)

(52) U.S. Cl.
CPC ............ *H04L 63/20* (2013.01); *H04L 63/102* (2013.01)

(58) Field of Classification Search
CPC .......................... G06F 21/10; H04L 29/06578
USPC .............................................................. 726/1
See application file for complete search history.

(56) References Cited

U.S. PATENT DOCUMENTS

| | | | |
|---|---|---|---|
| 7,478,419 B2 * | 1/2009 | Anderson | G06F 9/44505 709/228 |
| 8,554,980 B2 | 10/2013 | Bose | |
| 8,566,578 B1 | 10/2013 | Banerjee | |
| 8,918,834 B1 * | 12/2014 | Samuelsson | H04L 63/20 726/1 |
| 2004/0167984 A1 | 8/2004 | Herrmann | |
| 2005/0262132 A1 * | 11/2005 | Morita | G06F 21/6218 |
| 2006/0120526 A1 | 6/2006 | Boucher et al. | |
| 2008/0047010 A1 | 2/2008 | Marceau | |
| 2009/0063381 A1 * | 3/2009 | Chan | G06Q 10/10 706/47 |
| 2009/0089774 A1 | 4/2009 | Lynch et al. | |
| 2009/0288135 A1 * | 11/2009 | Chang | H04L 63/0263 726/1 |
| 2012/0291129 A1 | 11/2012 | Shulman et al. | |
| 2013/0117730 A1 | 5/2013 | Wisniewski | |
| 2013/0174211 A1 | 7/2013 | Aad et al. | |

OTHER PUBLICATIONS

U.S. Appl. No. 13/461,542 , "Final Office Action", dated Jan. 5, 2015, 26 pages.
U.S. Appl. No. 13/461,542 , "Non Final Office Action", dated Jul. 23, 2014, 30 pages.

(Continued)

*Primary Examiner* — Anthony D Brown
(74) *Attorney, Agent, or Firm* — Kilpatrick Townsend & Stockton LLP

(57) ABSTRACT

An access control policy can be received. The access control policy can identify privileges of a client to use resources to perform authorized actions with the resources. A set of related actions that are related to the authorized actions can be determined. The access control policy can be modified to include at least one related action.

20 Claims, 13 Drawing Sheets

(56) References Cited

OTHER PUBLICATIONS

U.S. Appl. No. 13/461,542, "Non-Final Office Action", dated May 21, 2015, 18 pages.
U.S. Appl. No. 13/461,542, "Non-Final Office Action", dated Jan. 15, 2014, 20 pages.
U.S. Appl. No. 13/461,542, "Notice of Allowance", dated Oct. 21, 2015, 8 pages.
"AppArmor", Available online at: https://wiki.ubuntu.com/AppArmor, May 4, 2018, 3 pages.
Shusain, "Beginner's Guide to SELinux", Available online at: https://linuxtechlab.com/beginners-guide-to-selinux/, Dec. 21, 2017, 10 pages.

\* cited by examiner

AUTOMATIC PRIVILEGE DETERMINATION

CROSS-REFERENCE TO RELATED APPLICATIONS

This application is a Continuation of U.S. patent application Ser. No. 13/461,542, filed May 1, 2012, issued to U.S. Pat. No. 9,264,449 on Feb. 16, 2016, and entitled "AUTOMATIC PRIVILEGE DETERMINATION," which is incorporated herein by reference in its entirety.

BACKGROUND

Security policies are often based on the concept of least privilege. Least privilege is directed to a client having the minimal access permissions necessary to accomplish required actions and nothing more. Any permissions that have been granted that are not needed to perform a correct function can be abused and or exploited and therefore should not be present. For example, a grant of too few permissions to a client charged with maintenance of a web server may prevent the client from performing essential functions, such as a server restart upon crash. In another example, a grant of too many permissions may allow a client charged with maintenance to make changes that may benefit the web server but break supporting systems, such as a change of static IP address. These additional permissions increase risk if the client's credentials are stolen or used improperly while providing no value.

However, implementing least privilege can be difficult. Client capabilities may not match authorized actions. Performing actions on a first resource may also require permissions to access a second or third resource. For example, a virtual machine may have access to block storage. A system charged with maintenance of the virtual machine may also need permission to clone and attach the block storage. However, in other cases, it may only be believed that access to a secondary resource is necessary, when it is not. Furthermore, client capabilities are not always static. Clients can become more capable or efficient over time, which may include a need for revisiting the security policies for each client. While various techniques have been employed to effectively prepare privilege policies, due to the complexity of the actions, the employed techniques are of varied success.

DETAILED DESCRIPTION

Figure 1:
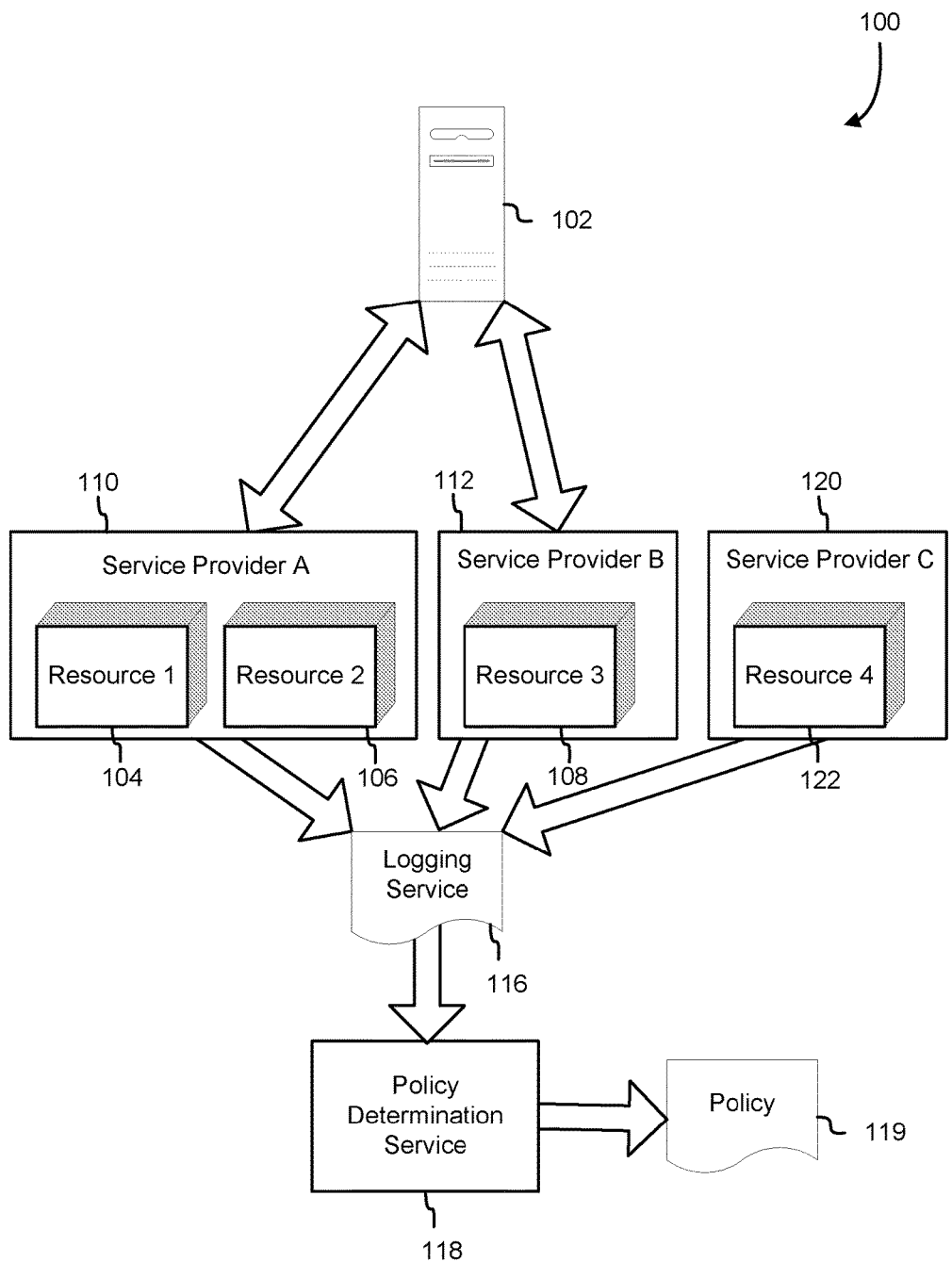
FIG. 1 shows an illustrative example of a privilege determination system environment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for automatically determining and/or revising an access control policy using actions attempted by a client system. A policy determination service analyzes the actions performed and/or requests issued by on behalf of an identity, such as a customer owned identity or client. Using the results of the analysis, the policy determination service determines the permissions needed in an access control policy that will be applied to the client. For example, a new client can request a training period where its actions are monitored, such as through a log of actions. A liberal access control policy is applied during the training period such that requests from an identity can be authorized without having requests denied. A policy determination service may then analyze the requests associated with the identity and determine an appropriate access control policy to authorize the requests issued by or on behalf of the identity. By using actual requests, the policy can be customized for the identity and more directly correlate with the least privilege required. In another example, the policy determination service reviews one or more logs related to an identity. Denied requests can be noted and analyzed to determine whether the identity should have the one or more additional permissions to authorize the denied requests. If so, a policy change request can be made and the one or more permissions can be added to the access control policy. In the same or another example embodiment, a current policy can also be analyzed against the logs to determine if certain requests have been infrequently made within a period of time. If not marked as an exception, a policy change request can be made to request removal of the permissions associated with the requests from the access control policy.

A customer owned identity may identify a relationship between a customer and a service provider. For example, a customer owned identity may identify an account of a customer of a service provider for which the actions or requests may be undertaken. In some embodiments the customer owned identity may be identified by a credential, reference or public identifier.

Automatic privilege determination can be used in initial policy determination, policy revision and policy correction. In initial policy determination, a customer owned identity can be monitored during a policy training period for the requests it issues while a liberal access control policy is applied. The observed actions performed can then be used to form a policy that fits the observed operation of the customer owned identity. For example, a web application server may be brought online and given a liberal access control policy during a training period. The web application may operate during the training period for a defined period of time, such as one month, under observation. After the month is up, actions observed during the liberal access control policy are included in a new access control policy. The new access control policy may then be applied to the web application. In one embodiment, a code coverage tool may be used to determine that relevant actions and/or requests are included in the access control policy. A code coverage tool may be used to analyze an executable or analyze a program. For example, the code coverage tool may analyze a program run in the client to estimate which functionality was exercised during the run. A code coverage tooling report may be created disclosing functionality that was and was not exercised during the training mode. The report may identify error handling and/or recovery that might be broken by the policy. For example, a service provider may receive an indication that new software is being deployed to replace prior software under an access control policy. The indication may be explicit, such as information disclosing an update or requesting a code coverage test through an API, or implicit, such as detecting that a program has changed or has a new version number. In response to the indication, a code coverage tool may be used to determine actions in the new software that are absent from the old software. The code coverage tool may also provide information about actions in the old software that do not exist in the new software. These determinations by the code coverage tool may then be used to revise or inform about proposed revisions to the access control policy.

In policy revision, denied actions and unused privileges can be checked by monitoring client actions with a policy applied. Policy change requests can be submitted to a customer to allow wrongly denied actions and/or remove unused privileges. For example, a customer may be notified that actions requested by a client are being denied due to an access control policy. The customer may then choose to revise the access control policy to allow the actions or continue to deny the actions. In some embodiments, the actions that would be denied may be held pending while a customer is requested to approve or deny the action. If the customer allows the request, the action may be allowed and included in a revised access control policy. If the request is denied, the action may be denied.

In policy correction, newly allowed or denied actions can be compared with related actions that form a sequence. If the action is determined to be part of a sequence, the policy change request may be modified to include the other steps of the sequence, if no conflicts are found. In some embodiments, related action may be reviewed for sensitivity, such as access to confidential information or personally identifiable information. If a related action is determined to be sensitive, the determination of whether to include the related action may be based at least in part on the relationship between the action and the related action. For example, a client may be given a privilege to start a virtual machine based on a machine image. Related actions may include retrieving the machine image from a high-durability datastore and examining the image. If the machine image includes confidential information, it may not be desirable to grant the client access to examine the image. However, retrieving the machine image and then starting the image forms part of a sequence. Therefore it may be desirable to allow the client to retrieve the machine image as a related action to the starting the virtual machine. The access control policy may therefore be tailored to include retrieving the machine image, but not allowing the examination of the machine image.

Figure 11:
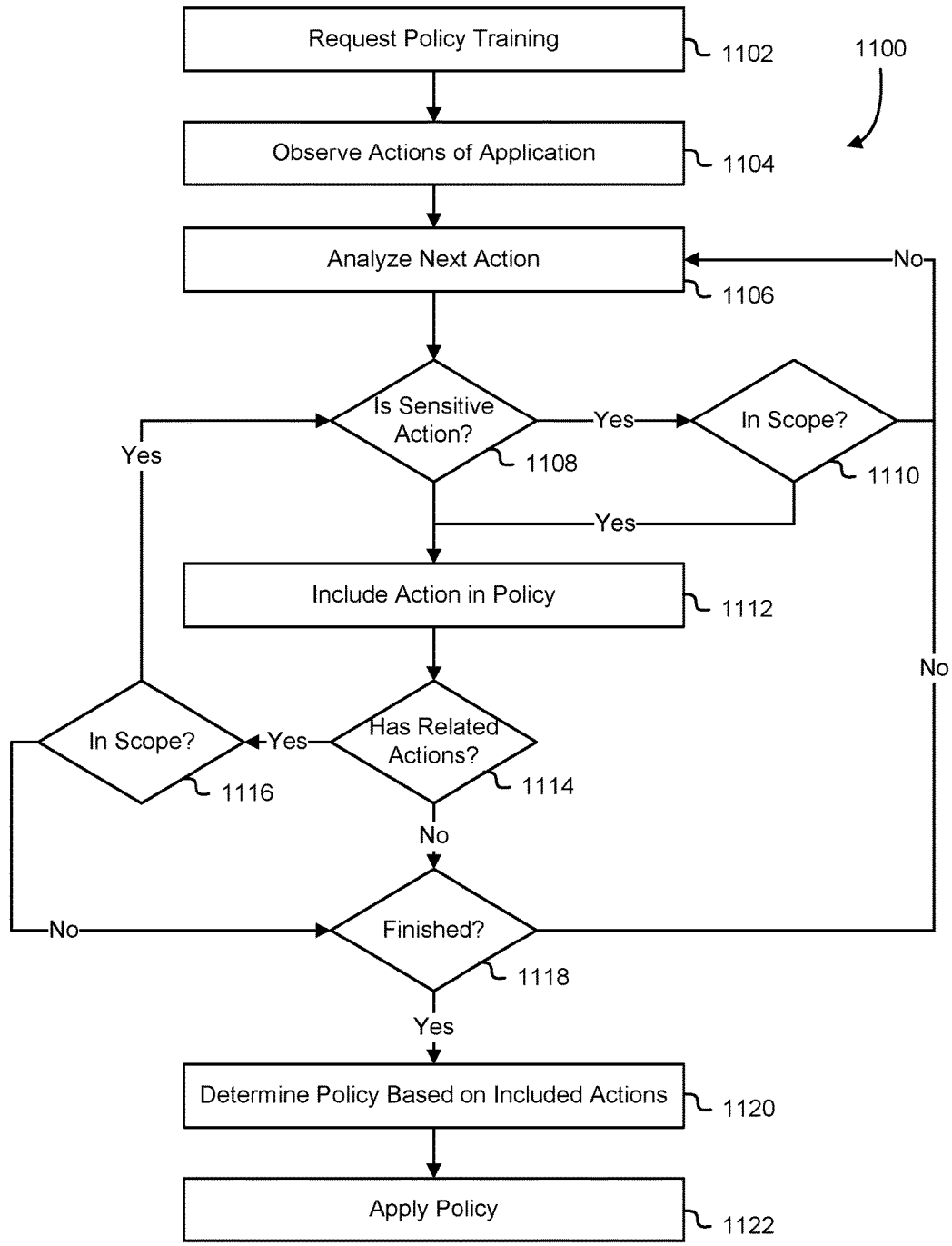
FIG. 11 shows an illustrative example of a context sensitive process that may be used to determine an access control policy in accordance with at least one embodiment.

An advantage of these embodiments of policy determination, policy revision and policy correction is that policy determination can be reasonably suggested to a user to accept or deny in a button click (as seen in FIG. 11) with the policy determination based on evidence. The scope of actions allowed can be more closely tailored to actions performed. Non-obvious permissions may be seen by the action of the client, where the non-obvious actions may not be obvious to a person unfamiliar with the system. For example, a database manager may need privileges to key generation and storage because initial setup and maintenance of databases may require setting up and using a secure connection for administrative access.

An exemplary environment 100 in which automatic privilege determination can be performed is shown in FIG. 1. A client 102, such as a server, accesses resources 104, 106 and 108 that are under control of service providers 110, 112. Service providers 110, 112 report accesses and/or resource usage to logging service 116, such as a collection of servers. As used herein, "access" includes resource access, resource usage, actions and/or requests. Logging service 116 provides information about accesses, such as through a log, to policy determination service 118, such as one or more servers. Policy determination service 118 then forms an access control policy 119 based on the information received from the logging service 116. While service provider 120 and resource 122 were not accessed by client 102, the service provider may or may not provide a report to logging service 116.

Figure 2:
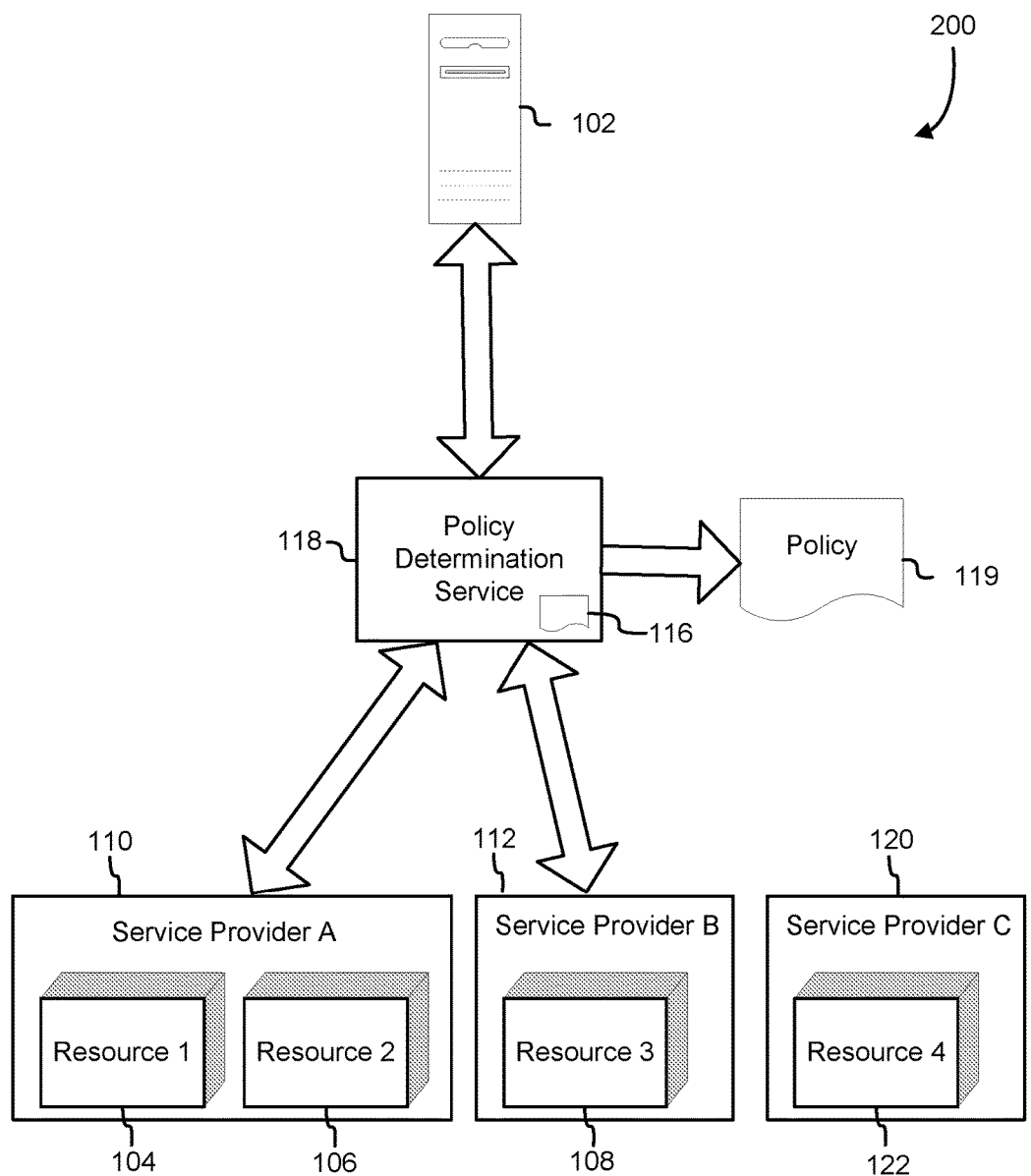
FIG. 2 shows an illustrative example of an alternate privilege determination system environment in accordance with at least one embodiment.

The logging service 116 can be placed in multiple ways. The logging service 116 can be part of the service providers 110, 112, 120, client 102, or policy determination service 118. For example service providers (e.g., 104, 106, 108) can receive a request for their logs and send the logs to a policy determination service 118 (such as seen in FIG. 1). In another example, the client 102 may track all issued requests and then provide a log or report to the policy determination service 118. In another embodiment, the client 102 may be a guest operating system with a hypervisor. The hypervisor may include a component that logs the outgoing requests and information to prepare a log or report on the client 102. In another embodiment, the policy determination service 118 serves as a proxy for all outgoing and incoming communication to monitor issued requests (such as seen in FIG. 2). In one embodiment the environment 100 may be contained in a program execution service. A customer, such as client 102, may interact with service providers 110, 112, 120 having an interface focusing on the service provided rather than the hardware supporting the service.

It should be recognized that while a log is specifically mentioned, other technologies, such as reports or streaming information may be used. In some embodiments, the information may be saved and then analyzed later. In an embodiment, reports are used to reduce storage costs. Information is compiled into a report such that when the policy determination service 118 performs the analysis, part of the analysis is already complete. In other embodiments, the information may be analyzed and/or compiled in real-time. For example, audit information may stream through a policy determination service 118 as a proxy (as seen in FIG. 2) (or logging service not shown). The policy determination service 118 may contain a window of a number of days, e.g., 60 days, of information. As information about requests pass through the policy determination service, a current actions statistical report is updated. If one too many requests are denied or a request isn't used for the designated time period of 60 days, an analysis may be performed to determine whether to modify the access control policy associated with an identity. In another embodiment, a code coverage tool may be used to identify actions or requests that are capable of being performed by a client. These identified actions or requests may be used to determine an access control policy directly. In other embodiments, the code coverage tool may determine a set of actions to be performed by the client and observed by the policy determination service. In yet other embodiments, the code coverage tool may report on actions or requests that were and/or were not performed during a training period. The code coverage tool may report on error handling or recovery that may be broken by the policy because of the actions or requests that were not performed.

Figure 3:
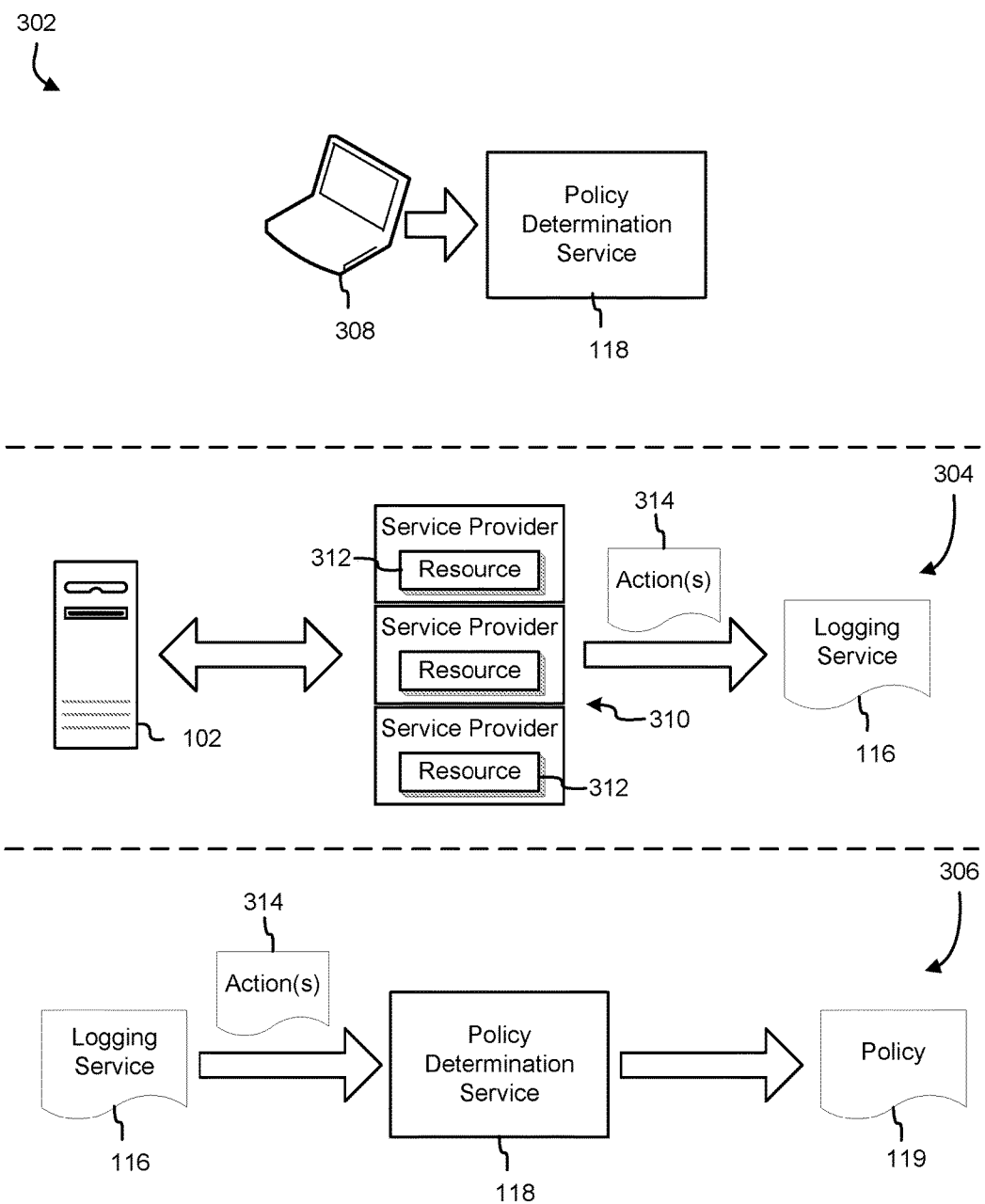
FIG. 3 shows an illustrative example of training communication within a privilege determination system in accordance with at least one embodiment.

An example of communication during initial policy determination can be seen in FIG. 3. In FIG. 3, the communications are shown in three phases: setup 302, training 304 and policy creation 306. In setup 302, a customer 308 requests a policy determination service 118 to prepare a policy for a client system 102. In the training phase 304, the client 102 communicates and/or performs actions 314 using the service providers 310 and/or their associated resources 312. The actions 314 of the client 102 are reported to the logging service 116. In the policy creation phase 306, the logging service 116 reports the actions 314 performed by the client 102 to the policy determination service 118. Using the actions 314 described by the logging service 116, the policy determination service 118 forms an access control policy 119.

During this training phase, it may be desirable to perform actions that are within the capability of the client. It may be desirable for a client 102 to exercise capabilities such that potential actions that may be performed are performed during this training phase. For example, a client may be used in a scripted environment such that normal actions, failure modes, recovery modes and less frequently performed actions are performed during training. In one embodiment, a script ensures that branches of a client application are performed during training.

The access control policy may be narrow, broad and/or context sensitive. If the access control policy is narrow, the privilege determination service may only include the actual actions 314 observed as performed by the client 102. If an access control policy 119 is configured to be broad, the privilege determination service 118 may include not only the actual actions observed, but also related actions that may not have been directly observed. If the access control policy 119 is configured to be context sensitive, the privilege determination service 118 may determine if an action accesses sensitive data or data in a sensitive way. In some embodiments this determination of sensitivity may be based on tagging of particular actions as sensitive, tagging of particular data as sensitive, or rules applied to data to automatically infer sensitivity (such as scans that identify access to personally identifiable information). If so, the access control policy may only include the action and potentially closely related actions. If not, the privilege determination service 118 may allow more related actions in the access control policy 119. In some embodiments, the privilege determination service 118 may determine that an action is part of a sequence. If an allowed action is part of a sequence, the privilege determination service 118 may request that the entire sequence of actions be allowed. For example, if a client has privileges to stop a volume and clone a volume, the service may also need a privilege to restart a volume as part of the cloning sequence.

Figure 4:
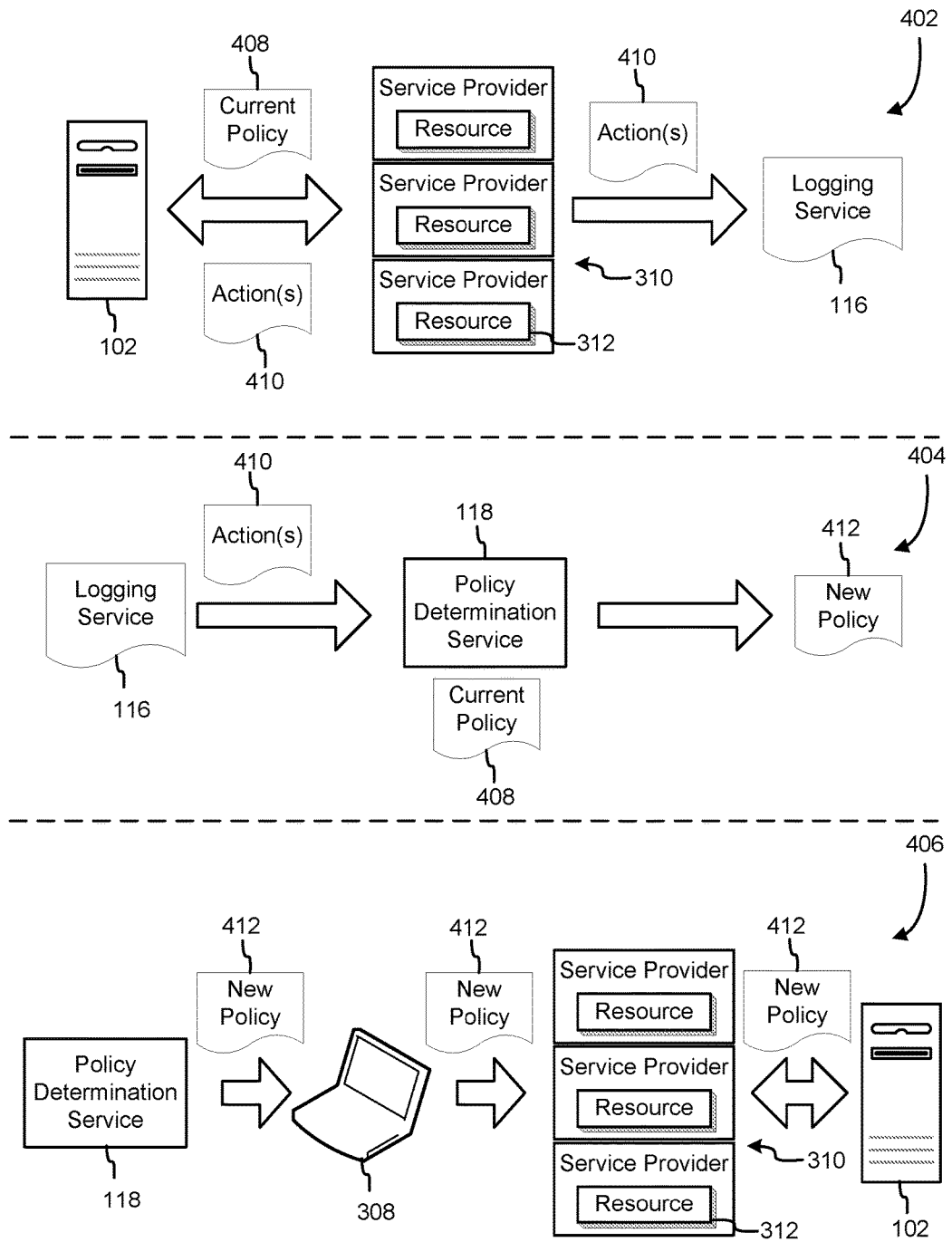
FIG. 4 shows an illustrative example of review communication within a privilege determination system in accordance with at least one embodiment.

An example of communication during a periodic review can be seen in FIG. 4. In FIG. 4, the communication is shown as three phases: normal operation 402, review 404 and policy change request 406. During normal operation 402, client 102 has privileges defined by a current policy 408 which allows actions 410 to be performed on service providers 310 and resources 312 subject to the current policy 408. The performed actions 410 may be stored by a logging service 116 for periodic review. Upon the periodic review 404, the logging service 116 may report the set of performed actions 410 to a policy determination service 118. The policy determination service 118 may review the performed actions 410 and the current policy 408. In some embodiments, the policy determination service 118 analyzes the performed actions 410 for underperformed or non-performed privileges to request for revocation. In some embodiments, the policy determination service 118 analyzes the performed actions 410 for failed requests. If the failed requests appear to be critical to the system or above a frequency, the policy determination may create a new policy 412 for approval. In some embodiments, instead of a new 412 policy, a policy change may be requested instead. During the policy change request phase 406, the policy determination system 118 may request a customer 308 to approve the new policy 412. Once approved, the new policy 412 may be applied to the interaction between service providers 310, resources 312 and the client 102.

Figure 5:
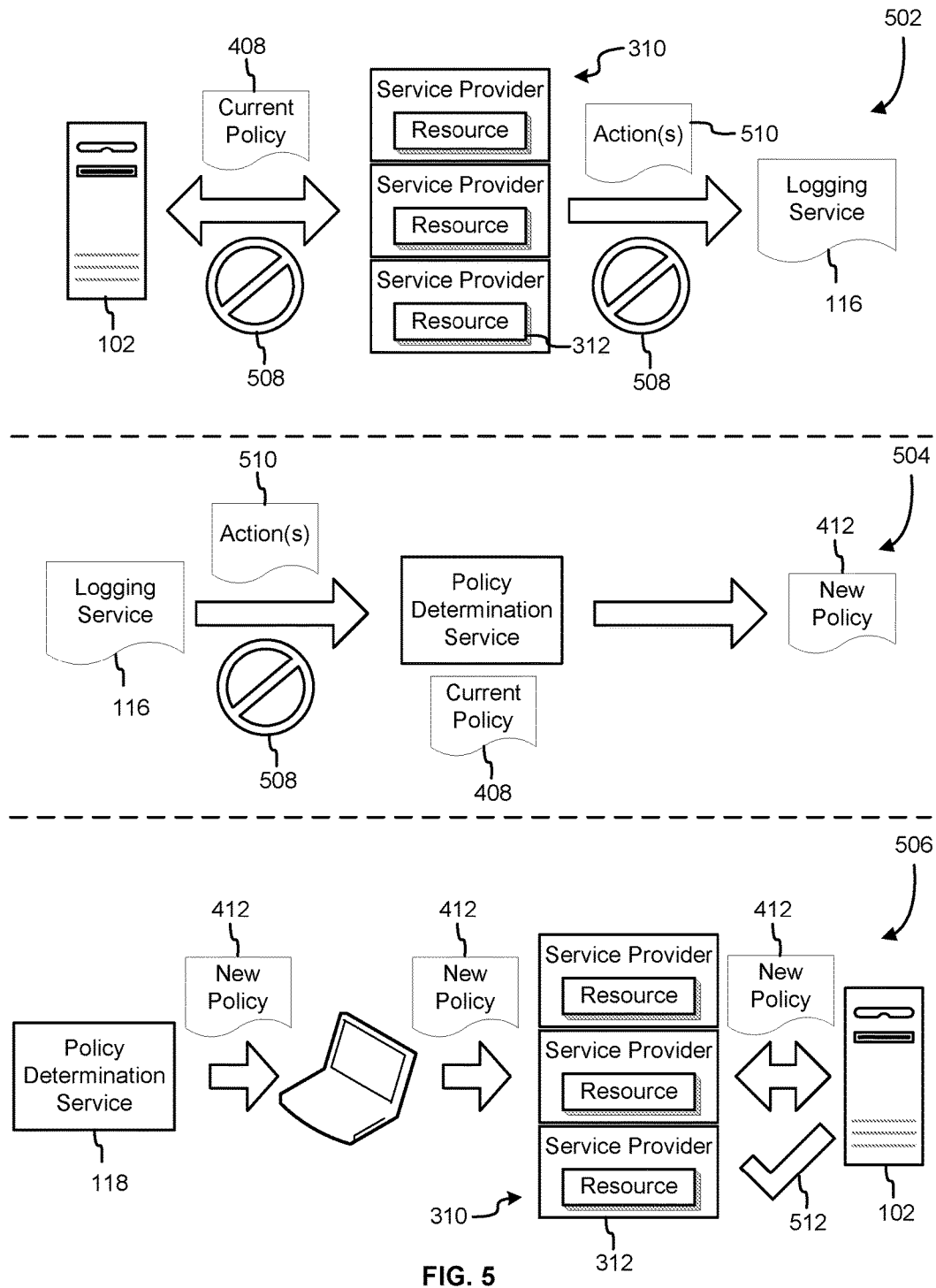
FIG. 5 shows an illustrative example of a failure review communication within a privilege determination system in accordance with at least one embodiment.

An example of communication during a failure review can be seen in FIG. 5. In FIG. 5, the communication is shown as three phases: failure notification 502, failure analysis 504 and failure correction 506. In failure notification and depending on the severity of the failure and the configuration of the system, denials 508 of an action 510 requested by a client 102 based on a current policy 408 may be noted by a logging service 116. In the failure analysis phase 504, the logging service 116 may forward the denial 508 and action 510 information may be sent to a policy determination service 118 for review. The policy determination service may review the denial 508 and the current access control policy 408. If warranted, the policy determination service may suggest a new policy 412 to prevent further denials 508. During the failure correction phase 506, the policy determination system 118 may request a customer 308 to approve the new policy 412. Once approved, the new policy 412 may be applied to the interaction between service providers 310, resources 312 and the client 102. The prior denial 508 may now result in an authorization 512 based in the new policy 412. As discussed before, if the denial is part of a sequence and is part of a suggested new policy 412, the policy determination service 118 may also request permission of the actions included in the rest of the sequence.

Figure 6:
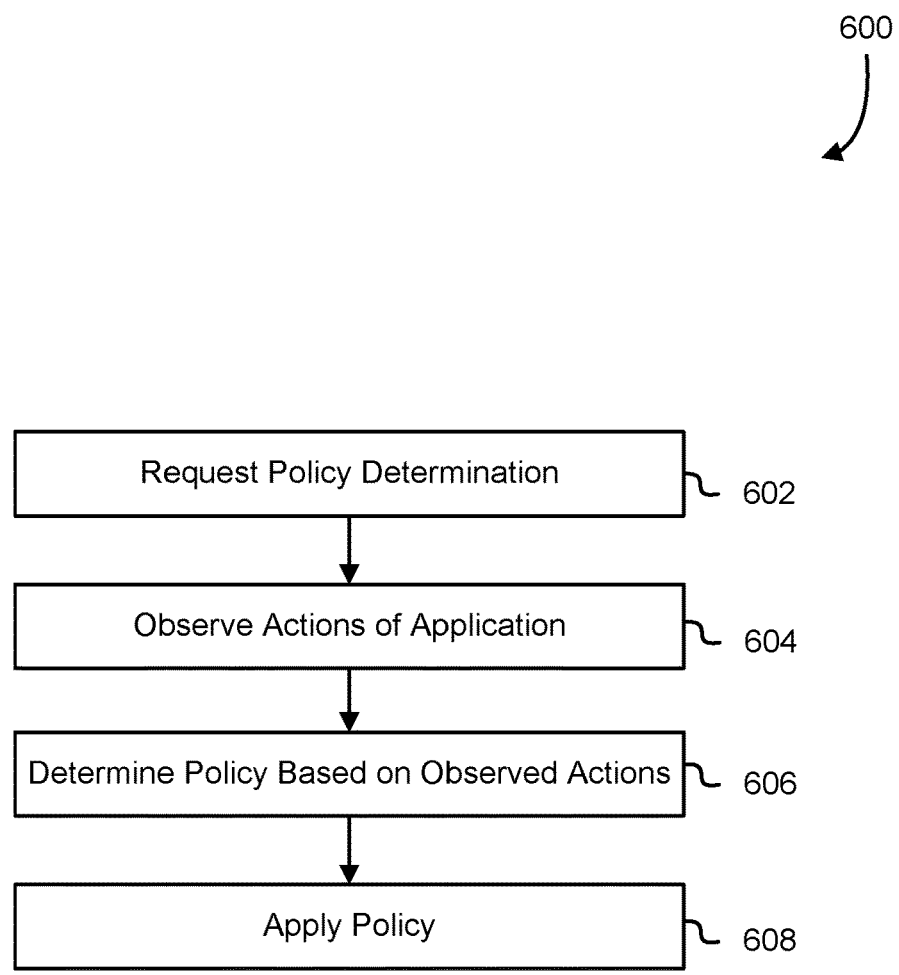
FIG. 6 shows an illustrative example of a process that may be used to determine an access control policy in accordance with at least one embodiment.

Process 600 in FIG. 6 describes an overview of a process used in an embodiment of an automatic policy generation system. For example, the policy generation service may be performed by a server seen in FIG. 1 analyzing information received from a logging service server performed by a client computing system. Some or all of the process 600 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Turning to the policy generation process 600 in FIG. 6, a policy generation system may receive 602 a request to make a policy determination. The policy generation system may receive information observed 604 about the actions performed by the client. The policy generation system may then consider the observed actions and determine 606 recommendations of a policy to include the observed actions and/or revising a policy currently in-place. If approved, the access control policy may be applied 608 to the client.

Figure 7:
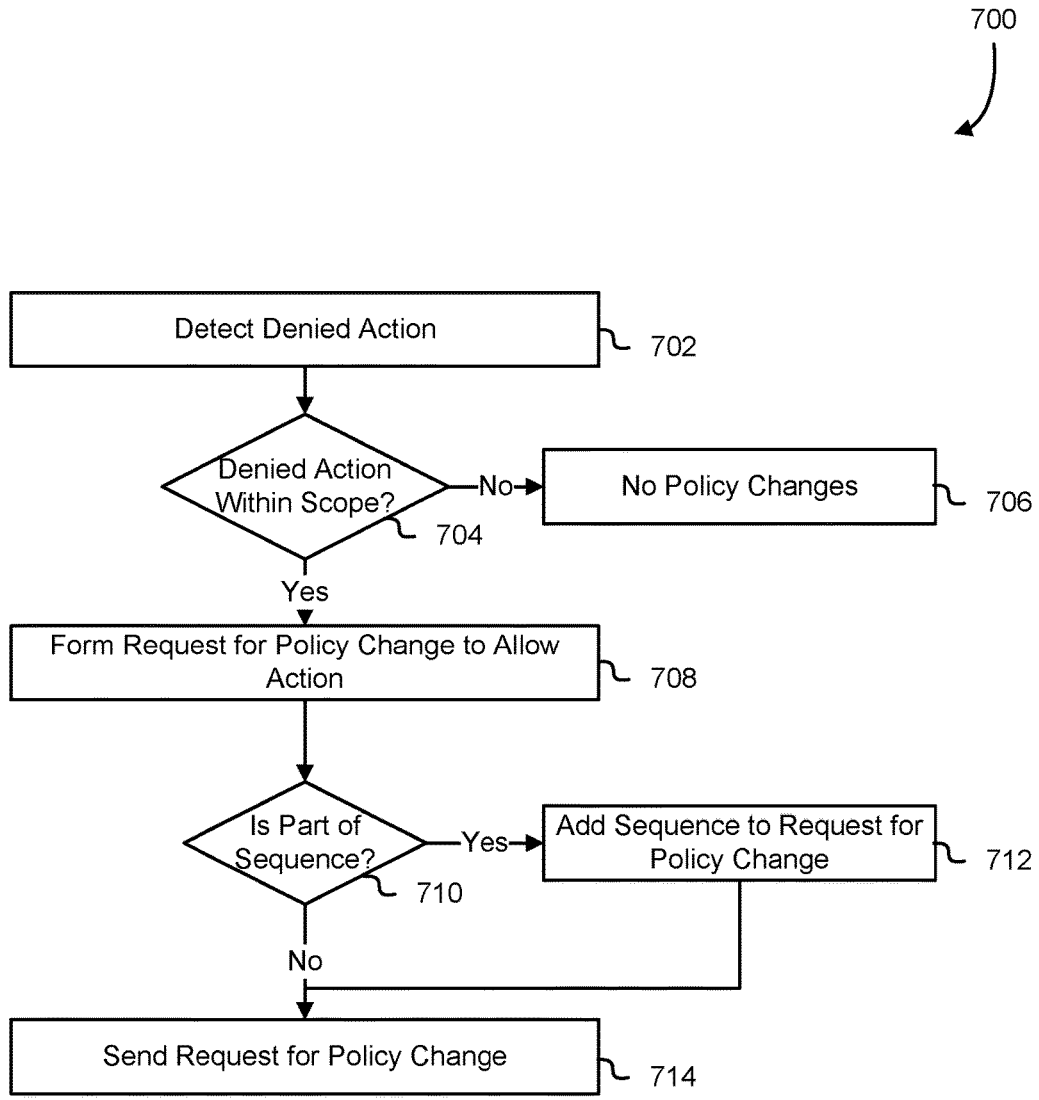
FIG. 7 shows an illustrative example of a process that may be used to correct policy errors in accordance with at least one embodiment.

Turning now to FIG. 7, a process 700 is described that may be used to correct policy errors. In one embodiment denied action 702 may be detected upon occurrence or review of a log. If the denied action does not 704 fit within the scope of allowed actions, no policy changes will be suggested 706. However, if within scope 704, a request for a policy change will be created 708. If the action is 710 part of a sequence of actions, the rest of the sequence of actions may be added 712 to the request. In either case, whether part of a sequence or not, the request for a policy change will be sent 714 for approval. By detecting sequences, a series of failures may be reduced, which can improve user experience and client downtime. If failures were not detected, each failed operation would cause a follow-up policy change request.

Figure 8:
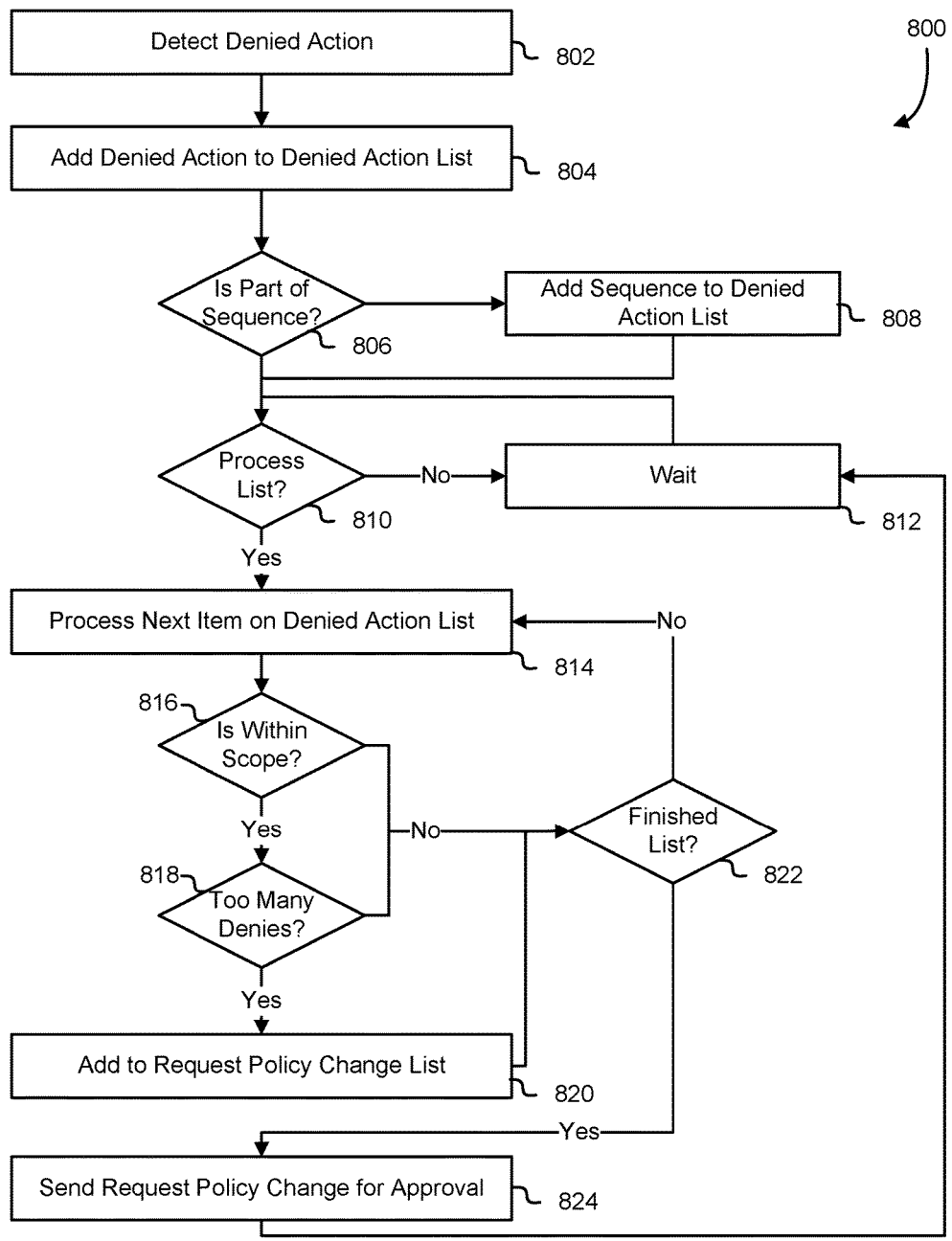
FIG. 8 shows an illustrative example of a process that may be used to correct sequence grants in privilege policies in accordance with at least one embodiment.

Turning now to FIG. 8, a process 800 that may be used to correct sequence grants in privilege policies is shown. In some embodiments, multiple actions may be processed. Upon detection 802 of a denied action, the denied action is added 804 to a denied action list. If the denied action is 806 part of a sequence, the sequence may also be added 808 to the denied action list. If not 806 or after the addition 808 to the list, the policy determination service may determine if it should process 810 the list. If not, it will wait 812. If so 810, the policy determination systems may process 814 the denied action list starting with the first action on the list. If the action is 816 within scope and has 818 too many denials, the action may be added 820 to the request for policy change and move on to see if the list is 822 finished. If the action is not within scope 816 or does not 818 have enough denials, the system may see if the list is 822 finished. If there are no more actions to process 822 on the list, the request for policy change will be sent 824 for approval. The process may then return to a wait state 812 for the next list to process. If there are still actions to process 822, then the next item may be processed 814.

Sequences may be detected by common permissions that run together. These permissions may be known to administrators and predefined as related. For example, write access to block storage may also generally be accompanied by read access to the block storage. Permissions to a first service that manages a second service may necessarily require permissions to the second service. The permissions may also be known through past experience. The past experience may be from other noted client policies, action logs or other experience. For example, a privilege to clone a database may also be frequently accompanied with a request to write and read to archive storage. The past experience may also be from past client policies, action logs or other experiences. For example, it has been observed that a statistics client has access privileges to logs. When a new web server is brought online, the privilege determination service can suggest permission to access the new web server logs be given to the statistics client.

Figure 9:
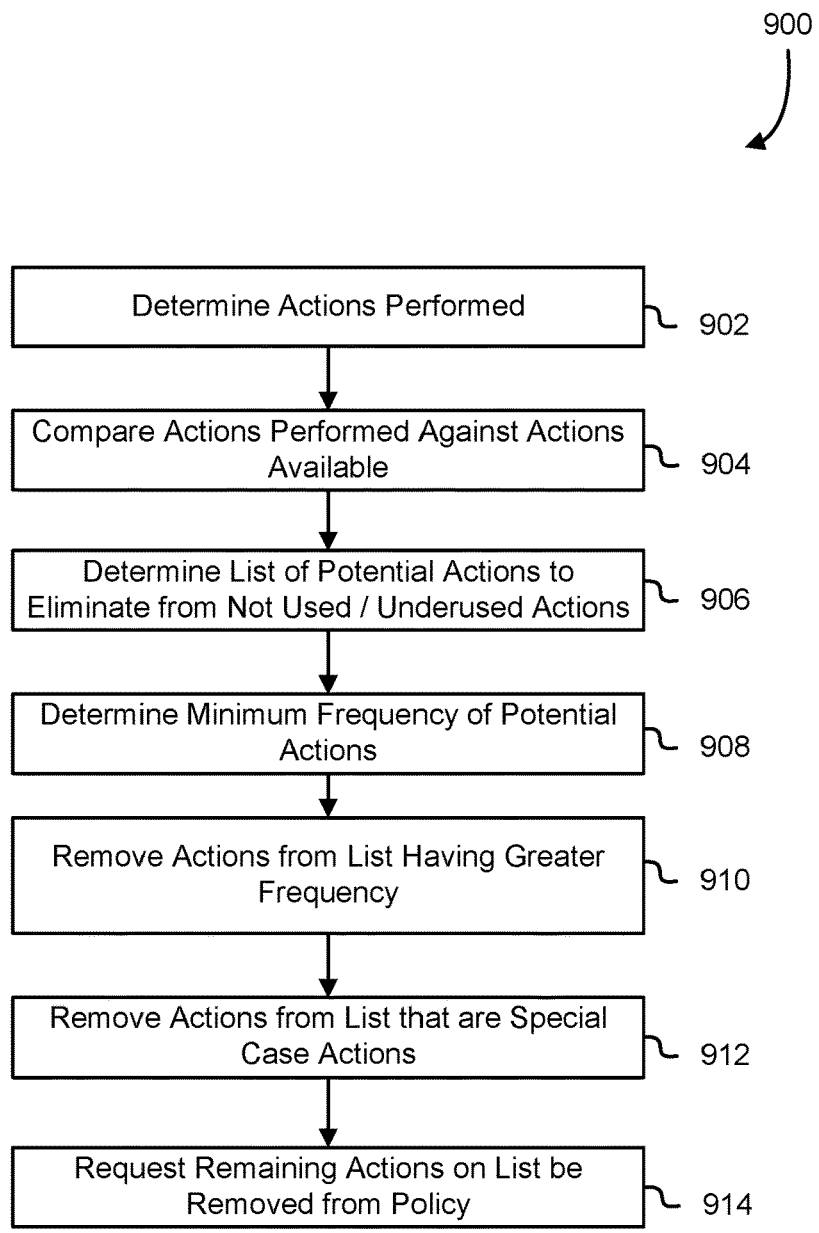
FIG. 9 shows an illustrative example of a process that may be used to revise privilege grants for unused actions in accordance with at least one embodiment.

Turning now to FIG. 9, a process 900 that may be used to revise privilege grants for unused actions is shown. In one embodiment, the privilege determination service determines 902 actions that have been performed. This determination may be from log analysis or live statistics. Actions performed may be compared 904 against actions available through the policy. A list of potential unused and/or underused actions may be constructed 906 from the comparing operation 904. For each potential action, a minimum expected frequency may be retrieved 908. For just unused actions, the minimum expected frequency may be one or a fraction of one. If an action has been used greater than the expected frequency, the action may be removed 910 from the list. If the action is a special case, then the action may be removed 912 from the list. For example, recovery actions may not be expected to be used except in emergency situations. Therefore, lack of use of emergency actions should not cause emergency privileges to be removed. An example embodiment may include a database management system having SMS and email communication ability to contact an administrator in the event of a system problem. While the management system is not expected to use the communication, the actions may be critical in the event of a problem. A policy change to remove the actions on the list may be sent 914 in a request for policy change.

Figure 10:
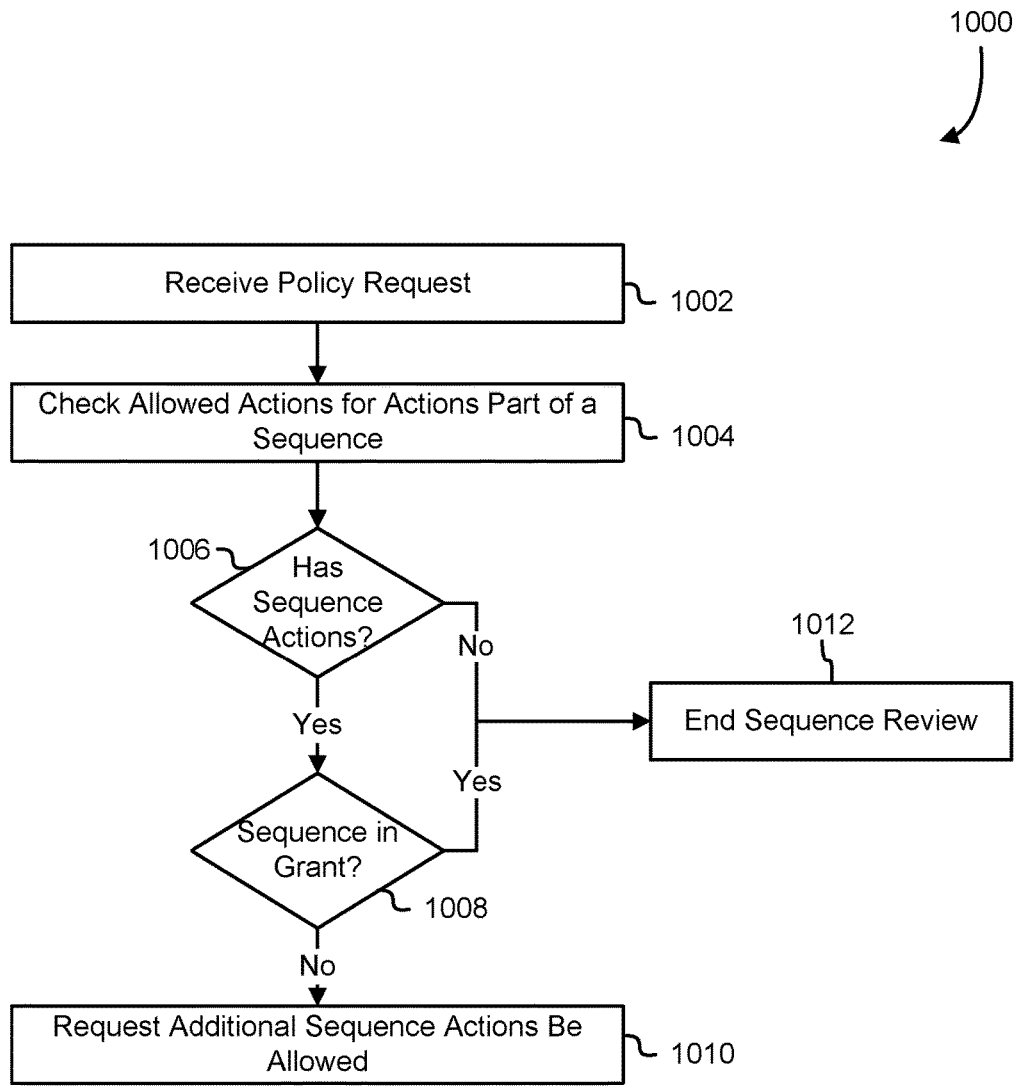
FIG. 10 shows an illustrative example of a process that may be used to correct ineffective privilege grants in accordance with at least one embodiment.

Turning now to FIG. 10, a process 1000 that may be used to correct ineffective privilege grants is shown. In some situations, an ineffective policy grant may be given. In the example shown, an ineffective policy grant is detected as leaving out portions of a sequence. Once a policy grant is received 1002, the policy grant maybe reviewed for allowed actions that contain 1004 only part of a sequence of actions. If there actions that form part 1006 of a sequence and the sequence actions are not 1008 in the grant, the missing actions may be requested 1010 to be included in the grant of privileges. If there are no sequence actions 1006 or the sequence actions are already included in the policy grant 1008, the sequence review for an ineffective policy grant may be terminated 1012. Other ineffective grants may include input or output privileges, which can also be detected. For example a web server having only incoming network read permission may be ineffective without also an outgoing write permission.

Turning now to FIG. 11, a context sensitive process 1100 that may be used to determine an access control policy is shown. A context sensitive process may include narrow privileges around sensitive actions that access sensitive data or modify data in a sensitive matter, while including broader privilege grants for other actions that are less sensitive. Sensitive actions and related actions may be reviewed to determine if the actions fit within a scope of actions to be accomplished by the client 102. If not, the actions may not be added to the policy. For example, if a database management system is responsible for database maintenance and creation, the database management system may exceed the scope of actions if it attempts to process payments.

In FIG. 11, the policy determination service may receive 1102 a request for policy training. After observing 1104 the actions of the application, each action may be analyzed 1106 for the access control policy determination. If the action is 1108 a sensitive action and within 1110 a scope of the application actions, the action is included 1112 in the policy request. If the sensitive action 1108 is not within 1110 scope, the next action is analyzed 1106. If the action is not sensitive 1108, the action may be included 1112 in the policy request. After including the action 1112, related actions are determined. If related actions are found 1114 and are within scope 1116, a sensitive analysis 1108 may be performed on the related action. If the related actions are not within scope or if no related actions are found, the service may determine if action analysis is finished 1118. If not 1118, the next action may be analyzed 1106. If the action analysis is finished 1118, the policy request may be generated 1120. If the policy is approved, the policy may be applied 1122.

Sensitive actions and the policy response to sensitive actions may be configured by a customer. In one embodiment, the customer may select a desired level of narrowness by adjusting a slider between expansive and narrow. A more expansive policy may allow more actions, while a more narrow grant allows fewer actions than the actions observed. For example restrictions may be added in a more narrow grant to include source IP address, time of day, secure protocol and other specifications. In one embodiment, a slider may be present for different tiers of sensitivity. A less sensitive set of actions may have a slider set to a more expansive setting, such as read and write privileges to a sandboxed scratch storage. While a very sensitive set of actions may have the slider set to a more narrow setting, such as manipulation and access to security keys.

It should be recognized that initial policy determination and training may be used not only for new policies, but may also be triggered or selected upon updates to a client and/or a client application. By revisiting the training, the privileges may be matched to new capabilities and removed functionality. For example, upon detection of an update of a client 102, the policy determination service 118 may revert to a training period with a more liberal access control policy. Upon termination of the training period, a new policy may be suggested for approval. The approval may be automatic or given by a customer. In some embodiments the policy determination system might also be operable to examine an old and new piece of client software to attempt to statically determine new privileges that the client software might need. These new privileges might be enabled for a training mode or might be added directly to the access control policy. In some embodiments, the new piece of client software, such as an update to the client software, may include metadata that describe new actions or privileges associated with the new piece of client software.

It should also be noted that the privilege determination service may also grant privileges that cost a customer money. For example, the policy determination system may discover that privilege restricting a web server to a certain number of requests per second may be soon exceeded because of new traffic to an e-commerce application. The policy determination system may revise the policy to allow the next tier of requests service be granted, with the next tier of service accruing a service cost.

In another embodiment, policies may be tried before live application through the policy determination service. A proposed policy may be played back against a log of actions of a client. Potential problems with the policy may be highlighted and discovered before the proposed policy would have gone live. As a trial is done with actual data, confidence in a proposed policy that passes the trial may be improved and mistakes may be reduced. Furthermore, the policy may be manipulated until it passes the trial, allowing a policy to be applied that at least would not have failed in the recorded past.

While privilege grants have been discussed, it should be recognized that privilege restrictions may also be used in a similar way. For example, in context sensitive policy determination, broad restrictions may be used for sensitive actions and narrow restrictions for other actions. Combinations of restrictions and grants may be used to determine the access privileges of a client, while making the access control policy more human readable. In one embodiment, a policy review may be used to simplify a complicated policy such that a detailed access control policy may be condensed to be more human readable format while retaining the privileges necessary for the client to accomplish its actions.

Figure 12:
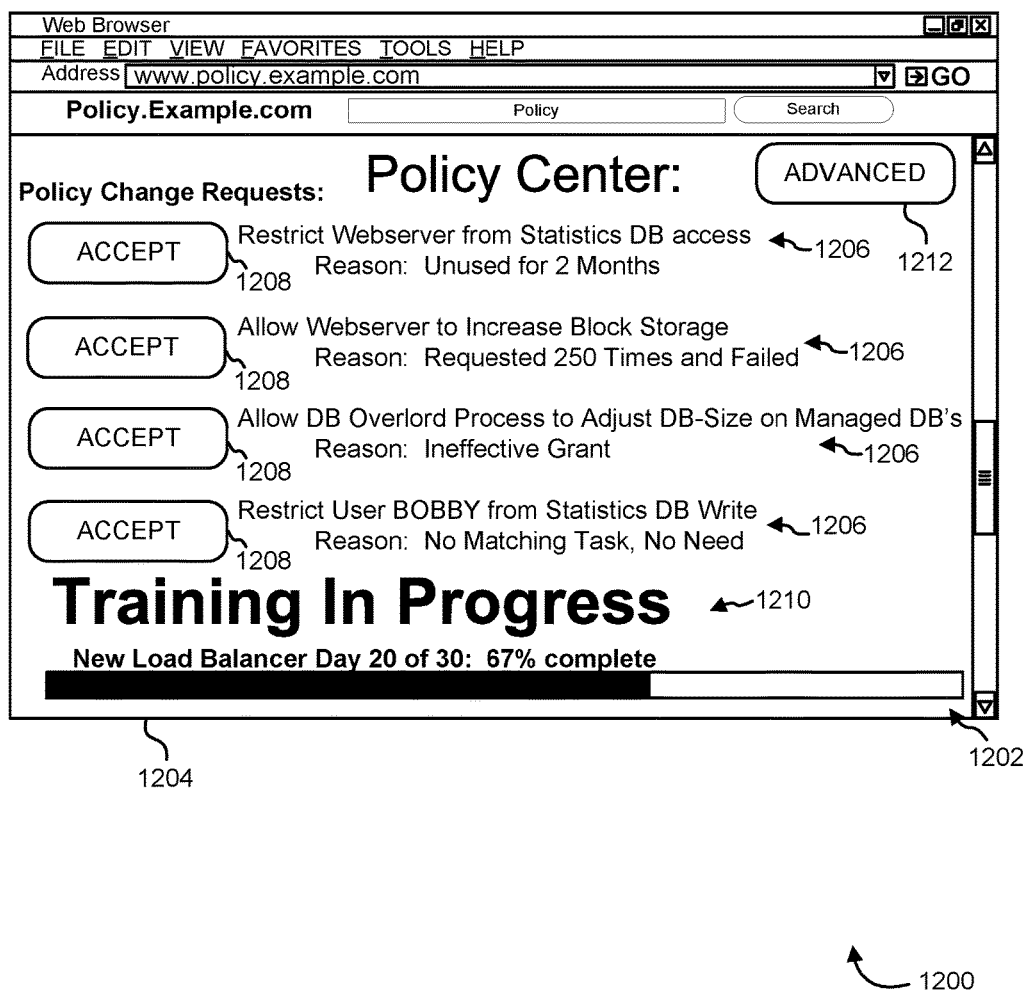
FIG. 12 shows an illustrative example of an access control policy determination display in accordance with at least one embodiment.

Turning now to FIG. 12, an access control policy determination display 1200 is shown. A web page 1202 displayed on a web browser interface 1204. The policy determination display may display several different requests and informational items. For example, requests for policy changes 1206 may be shown with accept buttons 1208. If more information about the policy request is desired, a user may click on the descriptive text to receive a more full description and adjust the recommendation. Information about training 1210 may be shown in a progress bar and descriptive information.

While a one-button push configuration of an access control policy may be desirable, an access control policy service can also allow for customization. For example, a customer may enter an advanced customization mode by clicking on an advanced button 1212 to override, configure, edit and/or create customized privilege policies.

Figure 13:
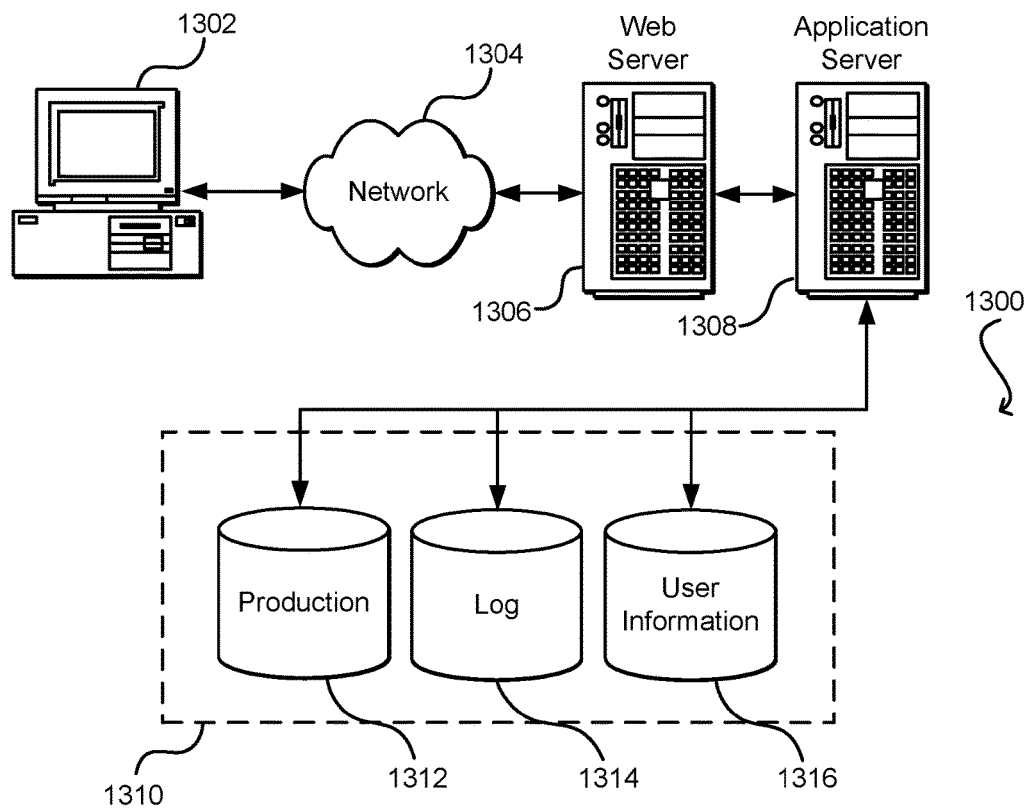
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform actions such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the various embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the scope of the claimed subject matter to the specific form or forms disclosed, but on the contrary, the intention is to cover all modifications, alternative constructions, and equivalents falling within the spirit and scope of the various embodiments, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate various embodiments and does not pose a limitation on the scope of the claimed subject matter unless otherwise indicated. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, via a network and by a logging service of a system including one or more processors executing instructions from one or more memories, an access control policy, the access control policy identifying privileges of a client to use one or more resources to perform authorized actions with the one or more resources;
   receiving, via the network and by the logging service of the system, information about a set of actions performed by the client with the one or more resources;
   analyzing, by a policy determination service of the system, the information about the set of performed actions with respect to the privileges granted by the access control policy to identify utilization of the privileges granted by the access control policy to the client; and
   modifying, by the policy determination service of the system and based at least in part on the utilization of the privileges, the access control policy to form a modified policy by at least:
      adding, by the policy determination service of the system, a first privilege to the access control policy to authorize a first action, the first action not previously authorized under the access control policy; or
      removing, by the policy determination service of the system, a second privilege from the access control policy to de-authorize a second action.

2. The computer-implemented method of claim 1, further comprising:

generating a policy change request that identifies one or more proposed modifications to the access control policy;
providing the policy change request to a user associated with the client; and
receiving authorization from the user to modify the access control policy in accordance with the policy change request.

3. The computer-implemented method of claim 1, wherein identifying the utilization of the privileges by the client comprises identifying one or more of underperformed privileges, non-performed privileges, or failed requests based on the privileges.

4. The computer-implemented method of claim 1, further comprising providing the modified policy to a service provider for enforcement with respect to actions performed by the client.

5. The computer-implemented method of claim 1, wherein receiving the information about the set of actions comprises receiving a log that includes the set of actions.

6. The computer-implemented method of claim 1, wherein the client is configured to perform at least a portion of the set of actions during a training period.

7. The computer-implemented method of claim 1, wherein a sequence of actions is performed using the first action, and wherein the performance of the sequence of actions would fail without performing the first action.

8. A computer system, comprising:
one or more processors; and
memory, including instructions executable by the one or more processors to cause the computer system to at least:
   detect, by a logging service of the computer system, denied actions requested by a client via a network, the denied actions being denied performance over a period of time based at least in part on an access control policy;
   identify, by a policy determination service of the computer system, a subset of the denied actions that are denied more than a threshold amount;
   confirm, by the policy determination service, that at least one denied action of the subset is within a scope of allowable actions, the scope of allowable actions defining which actions are allowed by the access control policy; and
   apply, by the policy determination service, a revised access control policy based at least in part on the confirmation, the revised access control policy including the subset of the denied actions.

9. The computer system of claim 8, wherein the confirmation comprises sending a request to an authorized client that is configured to confirm the revised access control policy.

10. The computer system of claim 9, wherein the request sent to the authorized client is configured to allow a confirmation of the revised access control policy through selection of an interface element.

11. The computer system of claim 8, wherein the denied actions are determined from observations of communications of the client.

12. The computer system of claim 11, wherein the observations are configured to be performed by a proxy.

13. A computer-implemented method, comprising:
receiving, via a network and by a logging service of a system including one or more processors executing instructions from one or more memories, an access control policy that identifies privileges of a client to use one or more resources to perform authorized actions with the one or more resources;
comparing, via the network and by a policy determination service of the system, the authorized actions with other actions performed by at least one other client to identify a set of related actions that are related to the authorized actions, at least one related action of the set of related actions missing from the access control policy; and
authorizing, by the policy determination service of the system, the at least one related action under the access control policy.

14. The computer-implemented method of claim 13, wherein the set of related actions form a sequence of actions, and wherein performance of the sequence of actions would fail without performing the at least one related action.

15. The computer-implemented method of claim 13, wherein the access control policy authorizes the at least one related action with restrictions based at least upon those of the set of related actions.

16. The computer-implemented method of claim 13, further comprising sending a request to an authorized client to authorize modification of the access control policy.

17. The computer-implemented method of claim 16, wherein the request is configured to display an interface element that allows a user to authorize the modification by selecting the interface element.

18. The computer-implemented method of claim 13, further comprising:
obtaining a set of actions related to the client; and
applying the access control policy to the set of actions to determine which actions of the set of actions would have failed the modified access control policy.

19. The computer-implemented method of claim 13, wherein the set of related actions exceeds a threshold of observation in other access control policies.

20. The computer system of claim 8, wherein:
the memory includes additional instructions executable by the one or more processors to cause the computer system to at least, subsequent to confirming that the at least one denied action of the subset is within the scope of allowable actions:
   provide a request for revision of the access control policy for presentation at a second client associated with an administrator;
   receive information from the second client indicating approval of the request for revision; and
   generate the applied revised access control policy by modifying the access control policy to include the subset of the denied actions in response to receiving the information; and
applying the revised access control policy comprises enabling, after generating the applied revised access control policy, the client to perform the at least one denied action from the subset of the denied actions.

* * * * *